July 14, 1942. J. L. WHITTEN 2,289,892
COMPENSATED METER
Filed Sept. 1, 1938
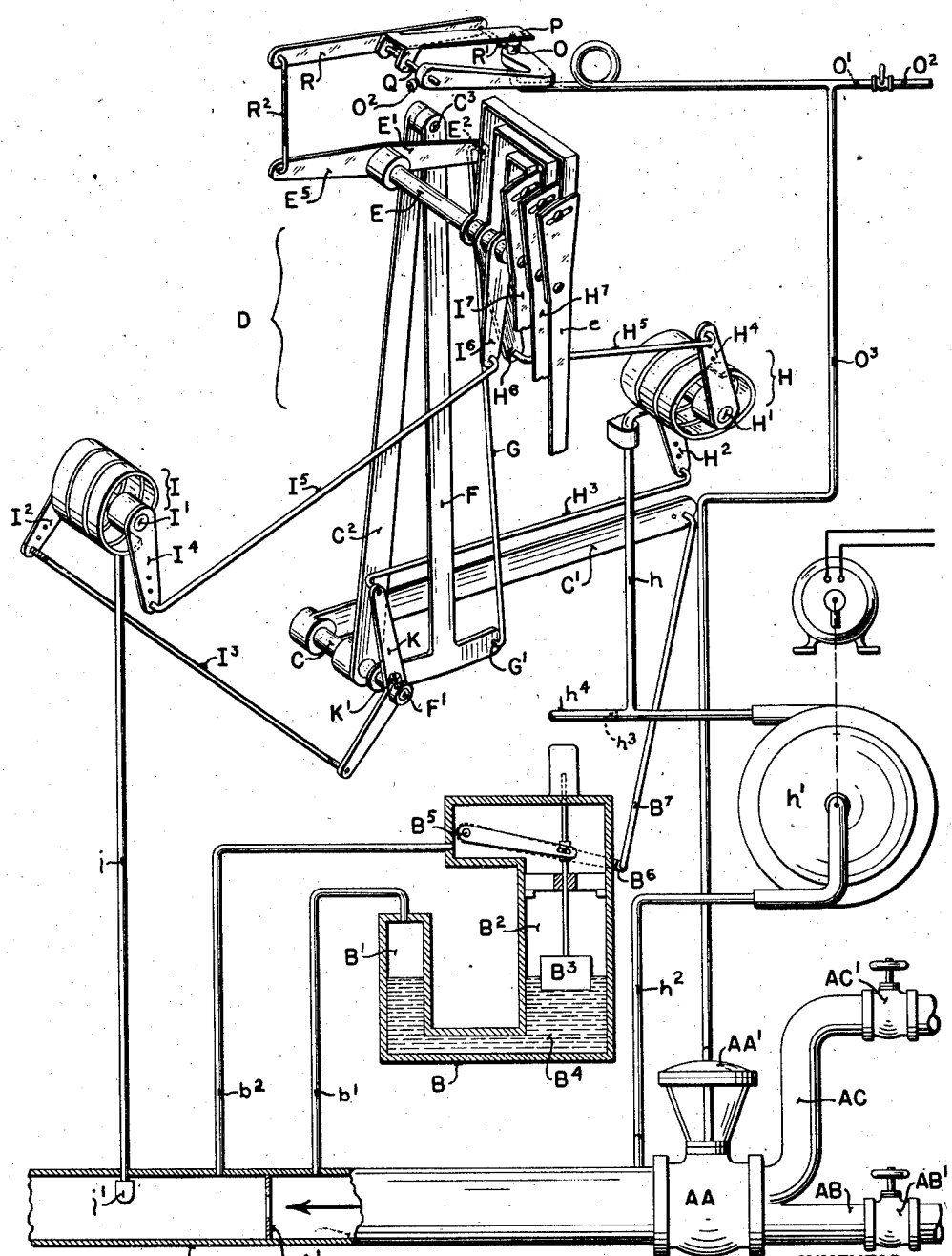
INVENTOR.
JAMES L. WHITTEN
BY George H. Mueller
ATTORNEY.

Patented July 14, 1942

2,289,892

UNITED STATES PATENT OFFICE 2,289,892

COMPENSATED METER

James L. Whitten, Rocky River, Ohio, assignor to The Brown Instrument Company, Philadelphia, Pa., a corporation of Pennsylvania Application September 1, 1938, Serial No. 227,929

4 Claims. (Cl. 73—193)

The general object of the present invention is to provide a continuous measure of the heat content of a flowing stream of gas, which varies in composition from time to time, in such manner as to effect related changes in the density and B. t. u. value of the gas. In some cases, the measurement, effected in accordance with the present invention, of the heat content of the fuel gas passing to a burner or furnace, is utilized in, and supplemented by a control of the gas flow rate, tending to maintain a constant rate of heat supply to the burner or furnace.

The present invention was primarily devised for, and is especially useful in plants and particularly steel plants including metallurgical or other industrial furnaces, heated by the combustion of a fuel gas formed by mixing a low B. t. u. gas, such as blast furnace or producer gas, with a substantially richer, and lighter, gas such as coke oven gas. Under the conditions prevailing in such plants, it is frequently impossible from the practical standpoint, to avoid substantial variations in the B. t. u. value of the fuel gas mixture, in particular because it is not practically feasible in many cases, to closely regulate or directly measure the relative portions of lean and rich gas in the mixture, and, volume for volume, only a small change in the mixture ratio is required for a significant change in the B. t. u. value of the mixture since the heating value of the lean gas may well be only 15 or 20% of that of the rich gas.

Under the conditions commonly prevailing in industrial plants of the kind referred to, it is practically important to have a measure of the rate at which heating units are supplied to an industrial furnace, to obtain a correct understanding of the furnace operating conditions, and to permit apparatus and personnel inefficiencies to be detected and corrected.

My present invention is characterized by the combination with a suitable flow meter for measuring the rate of gas flow through a furnace fuel supply or other conduit, of means for measuring the density of the gas flowing, and means for combining the two measurements to provide a measure of the heat content of the gas flowing through the conduit. In the preferred practical form of carrying out the invention, I make use of a known form of flow meter comprising compensating provisions, previously devised for use in measuring a vapor or gas flow, and correcting automatically for variations in the temperature and pressure of the vapor or gas.

The one figure of the accompanying drawing, is a diagrammatic representation partly in section, of a preferred embodiment of the present invention.

In the drawing, A represents a conduit for supplying to a gas burning furnace (not shown), a fuel gas, which is a mixture of a lean gas, such as blast furnace gas, supplied to the conduit A through a branch supply conduit AB, and a rich gas, such as coke oven gas, supplied to the conduit A through a branch supply conduit AC. As shown, the branches AB and AC include throttling or cut-off valves AB' and AC', respectively. As shown also, the rate at which gas flows through the conduit A is subject to regulation by a valve AA included in the conduit A, and controlled as hereinafter described.

The conduit A includes a measuring orifice A', and in the drawing, I have illustrated flow measuring means which is responsive to the difference between the pressure at the inlet and outlet sides of the orifice A', and is of the known type, including provisions for compensating for variations in the pressure and temperature of the fluid measured, which is disclosed in the Harrison Patent No. 2,052,764, dated September 1, 1936.

A differential pressure gauge or manometer B has its high pressure leg B' connected to the conduit A at the high pressure side of a measuring orifice A' therein by a pressure transmitting connection $b'$. The low pressure leg $B^2$ of the manometer B is connected to the conduit A at the low pressure side of the orifice A' by a pressure transmitting connection $b^2$. $B^3$ designates a float rising and falling with the changes in level of the manometer sealing liquid $B^4$, ordinarily mercury, in the low pressure leg $B^2$ of the manometer. The float $B^3$ is carried by an arm secured to a rock shaft $B^5$ projecting through the wall of the manometer and provided externally of the latter with an arm $B^6$. The arm $B^6$ is connected by a link $B^7$ to the main actuating arm C' of the flow exhibiting and control, or mechanism instrument D.

The arm C' is carried by a rock shaft C connected to, and oscillating the instrument shaft E, which carries and gives motion to the flow indicating or recording arm $e$ of the instrument.

The connections between the shafts C and E comprise an arm $C^2$ secured to the shaft C, and arm E' secured to the shaft E, a member F pivotally connected at $C^3$ to the arm $C^2$, and a link G pivotally connected at $E^2$ to the arm E' of the shaft E, and pivotally connected at G' to the member F. Preferably, the axis of the pivotal connection $C^3$ coincides with the axis of the pivotal connection $E^2$ between the arm $E'$ and the member G, when the shaft C occupies its no-flow position, that is, when the float $B^3$ of the manometer B is in its zero level position. In such condition of the apparatus, the oscillation of the member F about the axis of the pivotal connection $C^3$ does not give movement to the arm $E'$ and shaft E. With flow through the conduit A, the position of the float $B^3$ changes, and the shaft C is turned in the counter-clockwise direction. This moves the pivotal connection $C^3$ between the arms $C^2$ and member F counter-clockwise about the axis of the shaft C.

The extent of angular movement imparted to the shaft E, by a given angular movement of the shaft C, depends upon the displacement of the pivotal connection $G'$ between the members F and G, from the axis of the shaft C. When as a result of flow in the conduit A, the arm $C^2$ is displaced in the counter-clockwise direction from the position in which the axes of the pivotal connections $C^3$ and $E^2$ coincide, any angular movement then given the member F about the pivot $C^3$ increases or decreases the lateral displacement of the pivotal connection $G'$ from the shaft C. This, in effect, increases or decreases the leverage through which the shaft C acts on the shaft E, accordingly as said displacement is increased or decreased. In consequence, counter-clockwise angular adjustment of the member F about the axis of the connection $C^3$ gives movement to the arm $E'$ of the exhibiting mechanism, and thereby to the pointer or pen arm e, in the same direction as does an increase in the rate of gas flow through the conduit. Conversely, a clockwise angular adjustment of the member F moves the arm e in the same direction as does a decrease in the rate of gas flow.

In the apparatus shown in the drawing, the displacement of the pivotal connection $G'$ from the axis of the shaft C may be controlled by the joint action of two pressure responsive adjusting devices H and I. As shown, the device H is a Bourdon tube in the form of a helix, having one end fixed, and having its other end connected to a shaft $H'$ axially disposed in the helix. A controlling pressure is transmitted to the stationary end of the Bourdon tube by a pressure transmitting pipe h. The helical Bourdon tube of device H is so wound that as the pressure in the conduit h increases or decreases, the resultant flexure of the Bourdon tube rotates the shaft $H'$ in a clockwise or counter-clockwise direction, respectively. The shaft $H'$ carries an arm $H^2$ on one end which is connected by a link $H^3$ to a lever K journalled on a pin $F'$ carried by the member F. At its opposite end the shaft $H'$ carries an arm $H^4$ connected by a link $H^5$ to an arm $H^6$ journalled on the shaft E and connected to a pen arm $H^7$ for exhibiting the value of the pressure transmitted by the pipe h to the device H.

The device I is shown as generally similar to the pressure responsive device H, comprising parts $I'$, $I^2$ and $I^4$ corresponding to the parts $H'$, $H^2$ and $H^4$, respectively. The Bourdon tube helix of the element I has its stationary end connected to a pressure transmitting pipe i to a thermometer bulb $i'$ and containing an expansible fluid. The helix device I is so wound that when the pressure in the helix increases due to an increase in temperature of the fluid, the shaft $I'$ turns in the clockwise direction. The arm $I^2$ of the device is connected by a link $I^3$ to the lever K at the opposite side of the pivot $F'$ from that at which the lever K is connected to the link $H^3$. The arm $I^4$ is connected by a link $I^5$ to an arm $I^6$ journalled on the shaft E and connected to a pen arm $I^7$ for exhibiting the value of the pressure transmitted by the pipe i to the device I.

The construction and operation of the compensated flow meter shown in the drawing, in so far as it has been described, is in substantial accordance with the disclosure of the said Harrison Patent No. 2,052,764. As the rate of flow through the conduit A increases and diminishes, the resultant movements of the float $B^3$ gives counter-clockwise and clockwise adjustments, respectively, to the arm $C^2$, and counterclockwise and clockwise adjustments, respectively, to the pen arm e.

The device I compensates for the effect on the measuring apparatus of an increase or decrease in the difference between the pressures at the inlet and outlet side of the orifice $A'$, which, without change in the weight rate of gas flow through the conduit, may result from the change in gas velocity caused by the thermal expansion of the gas.

In accordance with the present invention, means are provided for maintaining a pressure in the pipe h and consequently in the Bourdon tube of device H, which increases and decreases with the density of the gas flowing through the conduit A. The means provided for the purpose comprises a motor driven blower $h'$ driven at constant speed. The outlet of the blower is connected to one end of the pipe h which thus transmits to the device H, the blower delivery pressure. The inlet of the blower is connected by a pipe $h^2$ to the conduit A.

As those skilled in the art will understand, with the described arrangement, and with little or no gas discharged by the blower, the pressure at the blower outlet will increase in a definite measurable relation with the density of the gas within the blower. To permit the composition of the gas within the blower to be the same as that of the gas flowing through the conduit A, provision may be made for a small continuous discharge of gas through the blower outlet. To this end, as shown, the outlet is connected to the conduit A by a pipe $h^4$ including a restricted orifice $h^3$.

The ratio of any angular adjustment of the shaft E and pen arm e, to the simultaneously effected angular adjustment of the shaft C, depends upon the extent of displacement of the connection $G'$ from the shaft C, a movement of the connection $G'$ toward or away from the shaft E, respectively decreasing or increasing the ratio. The gas density increase or decrease which causes the device $h'$ to increase or decrease the pressure transmitted to the device H, means a decrease or increase, respectively, in the number of B. t. u.'s in a cubic foot of gas. In consequence the device H is constructed and arranged so that when the pressure transmitted to the device H by the pipe h increases or decreases, the connection $G'$ is adjusted respectively toward or away from the shaft C to decrease or increase the deflection of the pen arm e. When the pressure in the pipe h is constant, an increase or decrease in the temperature of the gas flowing through the conduit A and consequent increase or decrease in the pressure transmitted through the pipe i to the device I, will cause the latter to give a clockwise or counterclockwise adjustment, respectively, to the lever K, and to correspondingly move the connection G' toward or away from the shaft C. A simultaneous increase or decrease in the pressures in the pipes $h$ and $i$, have an additive effect on the pen arm deflection. An increase in one pressure tends to neutralize a decrease in the other of the two pressures.

The measurements of the rate of B. t. u. supply, furnished by the deflective position of the arm $e$, and the measurements of the gas temperature and density, respectively, indicated by the deflective positions of the arms $I^7$ and $H^7$, are ordinarily recorded on a record chart, but the recording provisions which may be added to the mechanism shown are not illustrated herein, as they form no part of the present invention, and may take any one of various well known forms, and in particular, may be of the precise form disclosed in the above mentioned prior patent. Ordinarily the static gas pressure will not vary enough to have any significant effect upon the density of the gas flowing. Also, in some cases, at least, the gas temperature changes will be too small to have any significant effect upon the measurements obtained, and in such case, the device I may be dispensed with, or disconnected from the member F. As will be apparent if the link $I^3$ be disconnected from the lever K, and the latter be clamped to the member F as by means of the set screw K', the adjustment of the pivotal connection G' toward and away from the shaft C will be wholly due to the action of device H. The ratio or proportion of the movements of the shaft E due to a given change in the volume of flow and due to given changes in the gas temperature and gas density may be adjusted by changing the effective length of the lever arm C', $I^2$ and $H^2$, as by shifting links connected by those arms into engagement with one or another of the plurality of holes provided in the arms. The extent of movements of the pens $H^7$ and $I^7$ may be similarly adjusted by adjusting the link connections to the arms $H^4$ and $I^4$.

As those skilled in the art will realize, the apparatus disclosed is well adapted to provide a measure of the B. t. u. value of a mixture of gases differing in B. t. u. value and density as do blast furnace gas and coke oven gas. While blast furnace gas and coke oven gas may each vary somewhat in weight and B. t. u. value, the normal variation in either respect of either gas is relatively small. Normally, a cubic foot of blast furnace gas weighs about twice as much as a cubic foot of coke oven gas, and its combustion can be expected to liberate about 100 B. t. u.'s, while the combustion of a cubic foot of coke oven gas may be expected to liberate about 600 B. t. u.'s. The weight of a cubic foot of the mixture will increase, and its B. t. u. content will decrease, in linear proportion with the percentage of the mixture formed by the blast furnace gas.

As previously indicated, in some cases, it may be desirable to combine with the measuring apparatus already described, means for automatically adjusting the valve AA as required for a gas supply rate such that the rate at which heating units are liberated by the combustion of the gas will be approximately constant, notwithstanding variations in gas mixture composition effecting its density and B. t. u. value. The drawing diagrammatically illustrates one arrangement for the purpose, comprising air controller mechanism adjusted by the turning movements of the shaft E.

The air controller mechanism shown comprises a bleed nozzle O constantly receiving air through a restricted orifice O' from a pipe or other source $O^2$ of air under suitable pressure. The pressure of the air in the nozzle O and in the piping connecting the nozzle to the orifice O' depends upon the throttling effect of a flapper valve P journalled on a pivot Q, and shown as gravitationally biased for movement into the position in which it engages the nozzle member O and closes the discharge outlet in the latter. In operation, the angular position of the flapper P is made dependent on the angular position of the shaft E through a lever R journalled on the pivot Q, and provided at one end with a pin R', engaging the underside of the flapper P. The lever R is connected by a link $R^3$ to an arm $E^5$ secured to the shaft E, in such manner, that on a decrease in the B. t. u. content of the gas flowing, and a consequent clockwise angular adjustment of the shaft E, the flapper valve P will move toward the nozzle O and thus increase the nozzle pressure.

The nozzle pressure is transmitted by the pipe $O^3$ to the pressure chamber AA' of the fluid pressure motor valve AA. The latter is biased for movement in the closing direction, and is given an opening adjustment by an increase in the pressure transmitted to it by the pipe $O^3$. On an increase in the B. t. u. rate of flow through the conduit A, resulting in an increase in the pressure transmitted by the pipe $h$ to the device H, the flapper valve P is given a counterclockwise adjustment diminishing the pressure transmitted by the pipe $O^3$ to the chamber AA' and effecting a closing adjustment of the valve AA. The normal B. t. u. value which the instrument tends to maintain may be adjusted by shifting nozzle O about the axis of shaft Q in any suitable manner. The nozzle may, if desired, be fixed in its adjusted position by clamping screw $O^2$.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appendend claims and that in some cases certain features of my invention may be used to advantage without a corresponding use of other features.

Having now described my invention, what I claim as new and desire to secure by Letters Patent, is:

1. In apparatus for measuring the rate at which heating units are supplied by a flowing stream of fuel gas comprising a variable percentage of a gas which is higher in density and of lower B. t. u. value than the remainder of the mixture, the combination of exhibiting means, means responsive to the velocity of stream flow, a mechanical transmission mechanism through which the last mentioned means tends to actuate said exhibiting means in accordance with said velocity, and means responsive to the density of the gas in the stream for adjusting said mechanism to thereby modify the actuation of the exhibiting means by the first mentioned responsive means in inverse accordance with variations in said density.

2. In apparatus for measuring the rate at which heating units are supplied by a flowing stream of fuel gas comprising a variable percentage of a gas which is higher in density and of lower B. t. u. value than the remainder of the mixture, the combination of means responsive to the velocity head of the stream, exhibiting means, mechanical connection means through which the first mentioned means actuates said exhibiting means in accordance with said velocity head, and means responsive to the density of the gas in the stream for adjusting said connection means to modify the extent of actuation of the exhibiting means by the first mentioned responsive means in inverse accordance with variations in said density.

3. In apparatus for measuring the rate at which heating units are supplied by a flowing stream of fuel gas mixture comprising a variable percentage of one gas which is different in density and different in B. t. u. value than the remainder of the mixture, the combination of means responsive to the volumetric flow of said gas mixture, exhibiting means, mechanical connection means through which the first mentioned means actuates said exhibiting means, and means responsive to the change in the ratio by volume of the said one gas to the gas mixture and adapted to actuate said exhibiting means jointly with said flow measuring means, said ratio responsive means including means responsive to the density of said gas mixture and being adapted to actuate said exhibiting means on an increase or decrease in said density in a direction opposite to that in which said exhibiting means is actuated by the first mentioned means on an increase or decrease, respectively, in said volumetric flow.

4. In apparatus comprising an element to be actuated in accordance with the rate at which the heating units are supplied by a flowing stream of a fuel gas comprising a variable percentage of a gas which is higher in density and of lower B. t. u. value than the remainder of the mixture, the combination with said element, of means responsive to the velocity of stream flow, a mechanical transmission mechanism through which the last mentioned means tends to actuate said element in accordance with said velocity, and means responsive to the density of the gas in the stream for adjusting said mechanism to thereby modify the actuation of said element by the first mentioned responsive means in inverse accordance with variations in said density.

JAMES L. WHITTEN.